United States Patent [19]

Laage et al.

[11] 4,237,171

[45] Dec. 2, 1980

[54] INSULATED AND MOISTURE ABSORBENT FOOD CONTAINER AND METHOD OF MANUFACTURE

[75] Inventors: Fred C. Laage, 7149 Wildermere Dr., Rockford, Mich. 49341; Patrick A. Loftus, Grand Rapids, Mich.

[73] Assignee: Fred C. Laage, Rockford, Mich.

[21] Appl. No.: 13,123

[22] Filed: Feb. 21, 1979

[51] Int. Cl.³ .............................................. B65D 81/26
[52] U.S. Cl. .................................... 426/127; 220/458; 229/16 R; 229/33; 229/2.5 R; 229/3.1; 426/115; 426/128; 426/129; 428/35; 428/314; 428/315; 426/392; 426/394; 426/413
[58] Field of Search ............... 426/126, 127, 130, 109, 426/113, 129, 124, 115, 128, 392, 394, 413; 428/35, 314, 315; 220/457, 458; 229/2.5 R, 3.1, 3.5 R, 16, 33

[56] References Cited

U.S. PATENT DOCUMENTS

| | | | |
|---|---|---|---|
| 2,042,070 | 5/1936 | McCaskell | 229/2.5 R |
| 2,770,406 | 11/1956 | Lane | 428/314 |
| 2,999,758 | 9/1961 | Brown | 426/127 |
| 3,040,947 | 6/1962 | Wells et al. | 426/129 |
| 3,049,429 | 8/1962 | Couch et al. | 426/127 |
| 3,149,020 | 9/1964 | Fordyce et al. | 428/314 |
| 3,189,243 | 6/1965 | Lux | 426/127 |
| 3,335,846 | 8/1967 | Mills | 206/551 |
| 3,434,849 | 3/1969 | Carbone | 426/127 |
| 3,442,433 | 5/1969 | Lombardi et al. | 426/112 |
| 3,650,386 | 3/1972 | Tigner | 426/130 |
| 3,721,803 | 3/1973 | DiStefano | 426/113 |
| 3,915,772 | 10/1975 | Weissenfels | 428/314 |
| 3,930,917 | 1/1976 | Esakov et al. | 428/314 |
| 4,004,727 | 1/1977 | Rausing | 428/35 |

FOREIGN PATENT DOCUMENTS 873682 7/1961 United Kingdom .................... 162/135

Primary Examiner—Steven L. Weinstein
Attorney, Agent, or Firm—Price, Heneveld, Huizenga & Cooper

[57] ABSTRACT

The specification discloses a method for packaging hot foods in a unique container having an inner layer of absorbent paperboard adhered to an outer layer of resinous foam insulating material. The inner paperboard layer has an absorbent porous surface and has sufficient thickness and rigidity to lend body to the container. The outer foam layer is sufficiently thick to insulate and prevent moisture leakage.

20 Claims, 3 Drawing Figures

INSULATED AND MOISTURE ABSORBENT FOOD CONTAINER AND METHOD OF MANUFACTURE

BACKGROUND OF THE INVENTION

The present invention relates to a method for packaging fast foods in a unique container. Specifically, the present invention has utility in packaging hot food items such as pizza, chicken, hamburgers and the like.

Everyone has probably brought pizza or chicken home in a paperboard container. Such containers are often made out of corrugated board. Sometimes the pizza is placed on a circle of corrugated board and placed in a bag. Unfortunately, the hot food is often cold by the time you get home. Even more annoying, grease and condensing moisture often leak through the paperboard, corrugated board or paper bag onto your car seat or onto your clothes.

Some fast food chains, particularly hamburger emporiums, package their hot foods in foamed polystyrene containers. This material has been used in coffee cups for years. It has the advantage of keeping the hamburgers hot. Also, it is impossible for grease or condensed moisture to leak through the foam material.

This seems to provide an ideal solution to the dilemma of paper or paperboard containers for hot foods. Unfortunately, there is a subtle problem associated with use of styrofoam containers for hot foods. When hot foods are stored in styrofoam containers for a period of time, they become soggy. Pizza crust in particular becomes soggy. Hamburger buns tend to become soggy and limp. Crispy chicken arrives home as soggy chicken.

Also, foamed polystyrene containers are not entirely satisfactory for large containers such as pizza containers for a number of reasons. First, they have to be so thick to provide sufficient beam strength that they become very expensive. Secondly, they must be molded to a container shape. One cannot readily bend foamed polystyrene sheet into a container configuration since it tends to fracture and/or to follow its own irratic crease. This means that very costly molds and/or thermal forming have to be used. Also, it means the containers cannot be shipped and stored as flat blanks for later assembly by the user.

Some prior artists have attempted to solve this problem by venting plastic containers. Examples include U.S. Pat. No. 3,442,433 issued to Lombardi on May 6, 1969, and U.S. Pat. No. 4,058,214 issued to Mancuso on Nov. 15, 1977. It is our experience, however, that this solution is inadequate. There is still a tendency for it to "rain" inside the container, even with ventilation. Further, the ventilation tends to defeat the purpose of using the styrofoam container in that it lets heat out and allows cool air in.

SUMMARY OF THE INVENTION

The present invention comprises a method for packaging hot foods in a unique container wherein the container has an inner layer of absorbent paperboard adhered to an outer layer of resinous foam insulating material. The inner paperboard layer has an absorbent porous surface and has sufficient thickness and rigidity to give body to the container. The outer foam layer is sufficiently thick to insulate and prevent moisture leakage.

Moisture and grease generated in the container tends to soak into the paperboard. As a result, the food does not get soggy. Yet, it stays hot because of the insulating effect of the outer insulating foam layer.

The foam layer can be relatively thin, since the paperboard layer lends strength and body to the container, a good deal more per inch of thickness than foam. Also, when the paperboard is bent, along a score line for example, the foam will bend with it. Even if the foam does fracture, the container remains intact because the paperboard layer remains intact.

These and other features, aspects and advantages of the invention will be more fully understood and appreciated by reference to the written specification and appended drawings.

DESCRIPTION OF THE PREFERRED EMBODIMENT

Figure 1:
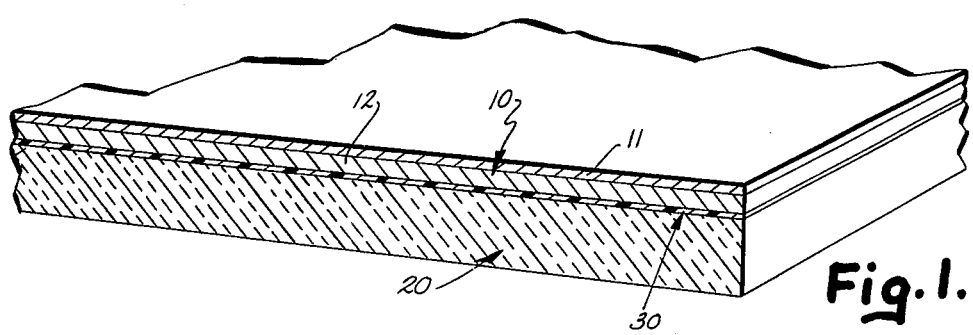
FIG. 1 is a fragmentary cross sectional view of the material from which the container of the present invention is made.
Figure 2:
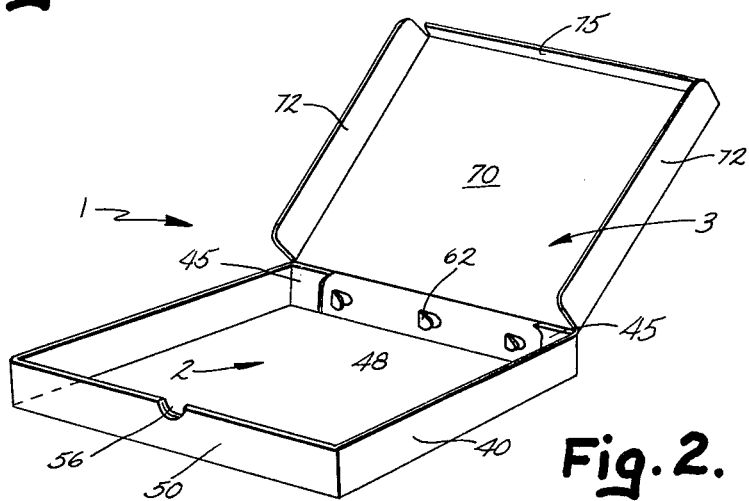
FIG. 2 is a perspective view of the container with its lid open.

In the preferred embodiment, the container 1 of the present invention (FIG. 2), which includes a main body 2 for holding the hot food item and a lid 3 for covering the container, is made of a laminated material comprising an inner paperboard layer 10 bonded to an exterior foam layer 20 by means of an intermediate layer of rubber based cement 30 (FIG. 1). Container 1 is shipped to the user as a flat sheet which is appropriately die cut and scored so that it can be folded into the shape of a container (compare FIGS. 3 and 2).

Paperboard layer 10 must be absorbent. It must have an absorbent interior surface. Its surface cannot be coated with a sealant such as wax or the like.

Further, it must be sufficiently thick that it gives strength and body to the container. This eliminates the need for an excessively thick foam layer. While the foam layer may lend strength to the container as a whole, one should be able to rely to a great extent on the stiffness of paperboard 10 to give body to the container, in view of the fact that the foam resin is so much more expensive than the paperboard.

The relative thickness of paperboard 10 will also lend to its absorbency. Yet, paperboard 10 should not be so thick that it cannot be readily bent into the shape of a container.

Preferably for containers such as pizza containers or chicken dinner containers, paperboard 10 should be at least about 0.015 inches thick. Probably, it could be as thick as 0.020 inches without detracting from the ability of a user to ship and store it flat and fold it into the shape of a container on the job. For smaller containers, as for example for holding individual hamburgers, thinner paperboard, as low as 0.010 inches would probably be acceptable.

Preferably, paperboard 10 includes a top layer 11 which is white and which is calendered to give it a smooth, hard and sterile appearance. The sterile appearance is considered to be aesthetically desirable in that people like to buy their foods in clean, sterile containers.

By providing a relatively hard, calendered surface, one provides a surface which can be cut on if necessary, without doing excessive damage to paperboard 10. This might be particularly desirable in the packaging of hot pizza. We have found that a clay coating on the surface of top layer 11 is also desirable from an appearance standpoint. It also affords a somewhat harder surface.

Specifically, we have found that clay coated news back provides a very desirable paperboard layer 10. In most applications, it should have a thickness of 0.016 inches.

Foam layer 20 must be sufficiently thick that it affords satisfactory insulation of the hot product within container 1. Also, foam layer 20 must be sufficiently thick that grease and condensing moisture do not readily leak through it in the event that they soak completely through paperboard layer 10. Yet, it should not be so thick that when it is bent it breaks. Thus, it has to have some bendability. Also, thickness should be minimized for economic reasons.

The foamed polystyrene used in conventional fast food foam containers is well suited for the practice of the present invention. Extruded foamed polystyrene is preferable. Other resinous foam insulating materials are known to those skilled in the plastics arts and would be acceptable if economical. The density of the foam should be approximately 4 to 5 pounds per cubic foot. Its thickness should be anywhere from 0.025 inches to 0.075 inches. 0.050 inches works well for larger containers such as pizza containers. In smaller containers such as individual hamburger boxes, the foam layer might be as thin as 0.010 inches, and certainly would not be thicker than 0.050 inches.

Preferably, paperboard 10 and foam 20 are bonded together by a rubber base adhesive 30. A rubber base adhesive is preferable since it stretches to accommodate differential expansion between paperboard layer 10 and foam layer 20. As paperboard layer 10 soaks up moisture and becomes heated by hot food stored in container 1, it will tend to expand at a different rate from foam layer 20. Because rubber adhesive layer 30 is rubbery and therefore somewhat flexible, it will shift and stretch to accommodate the differential expansion more readily without excessive deformation of container 1.

Preferably, rubber adhesive 30 is a synthetic latex base material in a water vehicle. A particularly desirable adhesive is available from St. Claire Rubber Co. of Marysville, Mich. under its trade designation No. 31011. Its viscosity on a Brookfield viscometer, four spindle at 20 RPM should be 3,000 to 6,000 CPS at 23° C. It contains between 65 and 69 percent solids by weight. Its weight per gallon is 9.5 to 10.5 pounds and it has a pH of 8.5 to 9.5.

The adhesive can be applied by brush, roller or spray gun. Preferably, the adhesive is applied to the foam since that seems to decrease at least to some extent the tendency of the water vehicle to soak into the paperboard. However, the paperboard is adhered to the foam within a matter of a few seconds and the invention is operable even when the adhesive is applied to the paperboard.

It is important that the adhesive selected be resistant to heat and moisture. The specific adhesive described above does have these qualities. This minimizes the chances of delamination once a piping hot, steaming pizza is placed in the container.

Figure 3:
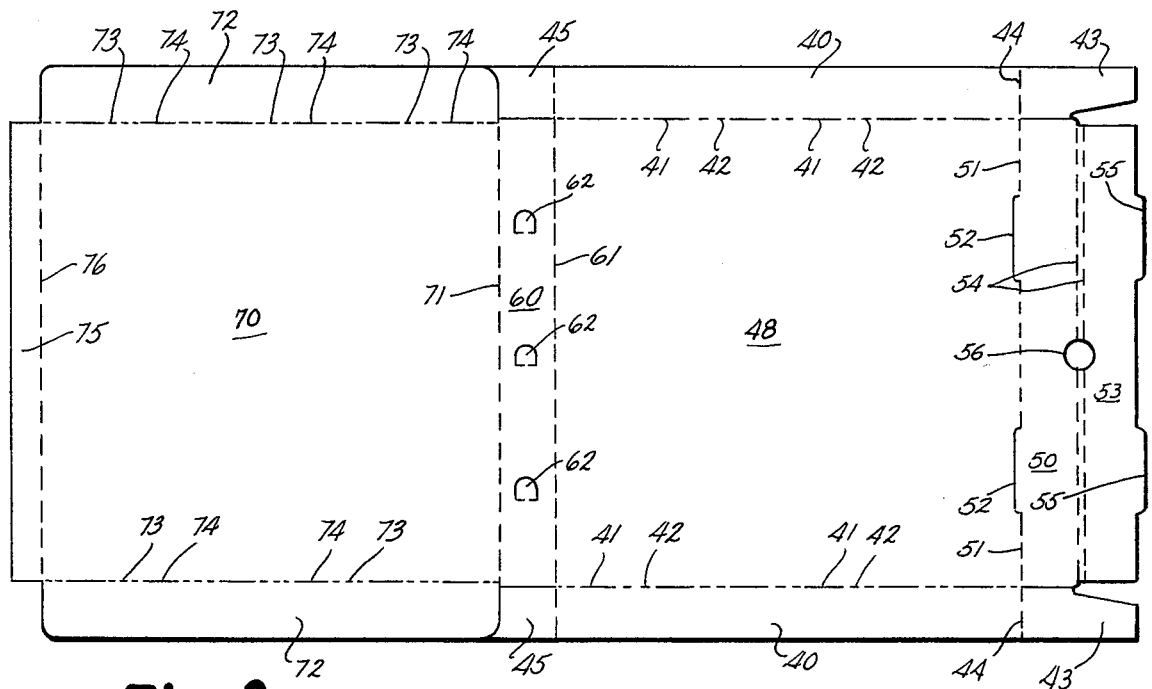
FIG. 3 is a top plan view of the inside surface of the container when the container is laid flat, prior to being folded into a container configuration.

Once the material is laminated, it is cut into container blanks as shown in FIG. 3. The paperboard layer is scored at appropriate points so that the blank can be folded into a container. Both the paperboard layer and the foam layer are cut through at some points to assist in this folding process. Because the score lines are in the paperboard layer, it will end up to the interior of container 1 when it is folded.

Specifically, the main body 2 of the container is formed of a bottom 48 which is alternatively cut and scored towards its side edges to define side flaps 40 (FIG. 3). Score lines are indicated at 41 and cuts through the paperboard and foam are indicated at 42. Side flaps 40 terminate at their front at score line 44 which separates a front flange 43 from side flap 40. Similarly, a rear score line 46 separates a rear flange 45 from side flap 40.

Bottom 48 is scored along line 51 to separate a front flap 50 therefrom. Front flap 50 is scored on two closely adjacent lines 54 to separate a fold-over flap 53 from front flap 50. Along score line 51, two tab receiving slots 52 are cut through paperboard 10 and foam layer 20. Fold-over flap 53 includes two downwardly projecting tabs 55 which, when container 1 is folded up, are inserted into slots 52.

There is a hole 56 in the center of the junction between front flap 50 and fold-over flap 53. When the container is folded into shape, the hole 56 provides finger access to the undersurface of container lid 3.

Bottom 48 terminates at its rear along score line 61 which separates rear wall 60 from bottom 48. Vent flaps 62 are cut into rear wall 60, although it is not anticipated that use of vent flaps 62 will be necessary except under extreme circumstances.

Score line 71 separates rear wall 60 from top wall 70 of lid 3. Lid 3 also includes top side flanges 72 which are separated from top wall 70 by intermittent score lines 73 and cuts 74. Score line 76 along the front of top 70 separates top front flange 75.

To use container 1, the user folds container blank 1 along the various score lines. Side flaps 40 are folded up and front and rear flanges 43 and 45 are folded inwardly. Front flap 50 is folded up against front flanges 43 and fold-over flap 53 is folded over front flanges 43. Tabs 55 are inserted into tab slots 52. Rear wall 60 is folded up and top side flanges 72 and top front flange 75 are folded downwardly. Top side flanges 72 are then inserted inside container body 2 so as to trap rear flanges 45 between the rear edges of top side flanges 72 and rear wall 60. Top front flange 75 is also inserted into main body 2. One can insert his finger or thumb into the notch created by hole 56 to thereby lift lid 3 up.

With container 1 thus folded, paperboard layer 10 is disposed towards the interior of container 1. The user now inserts a steaming hot pizza or other hot food item into container 1 and closes lid 3. Paperboard 10 absorbs any condensing moisture and any grease running off of the product. Foam layer 20 keeps the food hot and prevents any absorbed grease or moisture from leaking out of container 1.

Of course, it is understood that the above is a preferred embodiment of the invention and that various changes and alterations can be made without departing from the spirit and broader aspects thereof.

The embodiments of the invention in which an exclusive property or privilege is claimed are defined as follows:

1. A method for packaging a hot food having a first portion thereof of a constituency which gives off condensing moisture while in heated condition and an other portion of a constituency that is capable of absorbing said moisture with a negative affect on texture and appeal of said hot food comprising:

providing a covered container having an inner food containing layer of absorbent paperboard adhered to an outer layer of resinous foam insulating material enclosing said inner layer, wherein the inner paperboard layer has an absorbent porous surface and has sufficient thickness and rigidity to lend body and strength to the container, and wherein said outer foam layer is suffciently thick to insulate and prevent moisture leakage from said container; and placing said hot food in said covered container on said inner layer so that said absorbent paperboard absorbs a substantial amount of said moisture given off by said first portion thereby substantially lessening the moisture absorbed by said other portion to prevent the said other portion from becoming soggy, said resinous foam material preventing said moisture absorbed by said paperboard from leaking through said container while at the same time retaining heat in said container.

2. The method of claim 1 in which said step of providing said package includes providing a sufficiently thin paperboard that it can be bent from a flat sheet into the shape of a container, and providing a sufficiently thin foam layer that it will bend without excessive fracturing when said underlying paperboard layer is bent.

3. The method of claim 2 which includes providing said container in the form of a flat blank with score lines and die cuts at appropriate points whereby said blank can be folded into the shape of a container, followed by folding said blank into the shape of a container.

4. The method of claim 1, 2 or 3 in which said absorbent paperboard layer is adhered to said outer layer of resinous foam insulating material by means of a rubber base adhesive.

5. The method of claim 1 in which said hot food is pizza and said step of providing said container comprises providing a relatively large container for said pizza and making said paperboard at least 0.015 inches thick.

6. The method of claim 5 which includes providing said paperboard layer with a thickness of from 0.015 inches to 0.020 inches and providing said foam layer with a thickness of from 0.025 inches to 0.075 inches.

7. The method of claim 1 in which said hot food is a hot meat sandwich and said step of providing said container comprises providing a relatively small container for said sandwich, and providing said paperboard layer in a thickness of at least 0.010 inches and said foam layer in a thickness of at least 0.010 inches.

8. The method of claim 7 which includes providing said paperboard layer with a thickness of from about 0.010 inches to about 0.020 inches and providing said foam layer with a thickness of from 0.010 inches to 0.050 inches.

9. The method of any of claims 1–3 or 5–8 wherein said step of providing said container includes providing said foam layer with a density of 4 to 5 pounds per cubic foot.

10. The method of claim 1 wherein said step of providing said container includes providing said foam layer of a foamed polystyrene material.

11. The method of claim 10 wherein said step of providing said container includes providing said foam layer with a density of 4 to 5 pounds per cubic foot.

12. A method for packaging hot food having a first portion thereof of a constituency which gives off condensing moisture while in heated condition and an other portion of a constituency that is capable of absorbing said moisture with a negative affect on texture and appeal of said hot food comprising:

providing a covered container having an inner food contacting layer of absorbent paperboard adhered to an outer layer of resinous foam insulating material enclosing said inner layer, by an intermediate layer of a rubber based adhesive, wherein said inner paperboard layer has an absorbent porous surface and a thickness of from 0.010 inches to 0.020 inches, and wherein said outer foam layer has a thickness of from 0.010 inches to 0.075 inches and density of from approximately 4 to approximately 5 pounds per cubic foot, placing said hot food in said covered container on said inner layer so that said absorbent paperboard absorbs a substantial amount of said moisture given off by said first portion thereby substantially lessening the moisture absorbed by said other portion to prevent the said other portion from becoming soggy, said resinous foam material preventing said moisture absorbed by said paperboard from leaking through said container while at the same time retaining heat in said container.

13. The method of claim 12 wherein said step of providing said container includes providing said foam layer of a foamed polystyrene material.

14. In a hot food package comprising a covered container containing hot food having a first portion thereof of a constituency which while in heated condition gives off condensing moisture and an other portion of a constituency that is capable of absorbing said moisture with a negative affect on texture and appeal of said hot food; the improvement comprising said covered container being constructed of an inner food contacting layer of absorbent paperboard adhered to a outer layer of resinous foam insulating material enclosing said inner layer, wherein said paperboard layer has an absorbent porous exposed inner surface and has sufficient thickness and rigidity to lend body and strength to the container, yet is sufficiently thin that it can be bent from flat sheet into the shape of a container, and wherein said outer foam layer is sufficiently thick to insulate and prevent moisture leakage, yet is sufficiently thin that it will bend without excessive fracturing when said paperboard is bent;

said absorbent paperboard absorbing a substantial amount of said moisture given off by said first portion of said food thereby substantially lessening the moisture absorbed by said other portion to prevent the said other portion from becoming soggy, said resinous foam material preventing said moisture absorbed by said paperboard from leaking through said container while at the same time retaining heat in said container.

15. The package of claim 14 wherein said foam has a density of between about 4 and about 5 pounds per cubic foot.

16. The package of claim 14 wherein said paperboard has a hard surface oriented towards the interior of said container.

17. The package of claims 14, 15, or 16 wherein said foam is polystyrene foam.

18. The package of claims 14, 15, or 16 in which the package is formed from a die-cut and scored container blank folded into said container and in which said paperboard is scored at various points to facilitate folding said blank into a container with said paperboard oriented towards the interior of said container.

19. The package of claim 14 in which the hot food is pizza.

20. The package of claim 14 in which the hot food is a hot meat sandwich.

* * * * *

UNITED STATES PATENT AND TRADEMARK OFFICE
CERTIFICATE OF CORRECTION

PATENT NO. : 4,237,171
DATED : December 2, 1980
INVENTOR(S) : Fred C. Laage et al.

It is certified that error appears in the above—identified patent and that said Letters Patent is hereby corrected as shown below:

Column 5, line 5, Claim 1:

"containing" should read -- contacting --.

Column 6, line 41, Claim 14:

before "container" delete "covered".

Signed and Sealed this

Twenty-third Day of June 1981

[SEAL]

Attest:

RENE D. TEGTMEYER

Attesting Officer     Acting Commissioner of Patents and Trademarks